Figure 1:
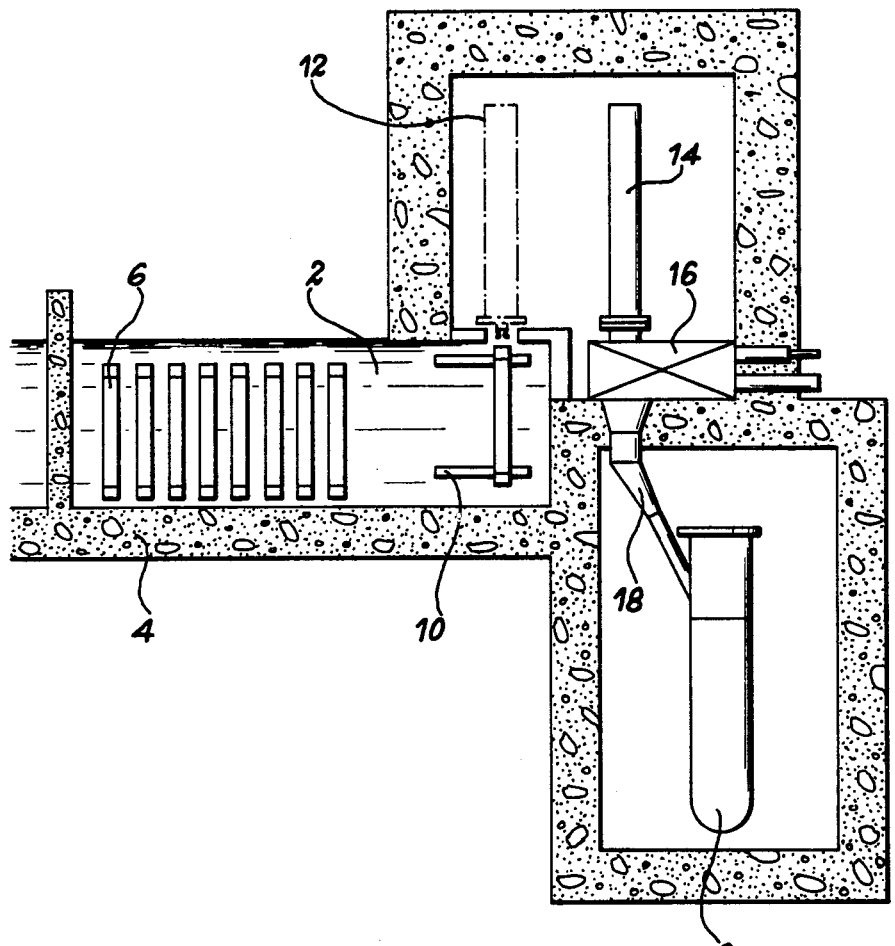

United States Patent [19]

Chazé et al.

[11] 4,091,699

[45] May 30, 1978

[54] METHOD AND DEVICE FOR CUTTING A BUNDLE OF TUBES

[75] Inventors: Gilbert Chazé, Bourg-la-Reine; Guy Cherel, Le Vesinet; René Guilloteau, Verrieres-le-Buisson; Daniel Tucoulat, La Frette sur Seine, all of France

[73] Assignees: Saint-Gobain Techniques Nouvelles, Courbevoie; Commissariat a l'Energie Atomique, Paris, both of France

[21] Appl. No.: 721,442

[22] Filed: Sept. 8, 1976

[30] Foreign Application Priority Data

Sept. 11, 1975 France .................. 75 27897

[51] Int. Cl.² .................. B26D 4/50; B26D 7/06
[52] U.S. Cl. .................. 83/56; 83/277; 83/282; 83/719; 83/437; 83/925 R
[58] Field of Search .................. 83/409.2, 282, 257, 83/267, 276, 277, 56, 411 A, 422, 437, 719

[56] References Cited

U.S. PATENT DOCUMENTS

| | | | |
|---|---|---|---|
| 3,621,742 | 11/1971 | Kendall | 83/282 X |
| 3,722,338 | 3/1973 | Cherel | 83/282 X |
| 3,851,554 | 12/1974 | Papai | 83/409.2 X |

*Primary Examiner*—Willie G. Abercrombie
*Attorney, Agent, or Firm*—McNenny, Pearne, Gordon, Gail, Dickinson & Schiller

[57] ABSTRACT

The invention relates to a method and device for cutting a bundle of tubes containing a nuclear fuel into pieces having a preset length so that the fuel can be dissolved in a suitable solution.

The bundle of tubes is introduced into a guide tube in a shearing machine and is clamped by two side clamps within the tube so as to limit the width of the bundle to the diameter of one tube of the bundle. The side clamps subject the bundle to a sideways thrust so that the tubes in the bundle are maintained contiguous without any excessive curvature. The bundle of tubes is then submitted to a cutting operation at right angles to its major dimension and after the blade has been returned to its inoperative position a safety plate is positioned near the cut section at a distance slightly greater than the forward movement of the bundle between two successive cutting operations. The side clamps are then withdrawn by a limited amount so that the resilience of the tubes causes them to remain in contact with the clamps. The bundle of tubes is then pushed forwardly after which the bundle is again clamped by the two side clamps prior to the next cutting operation.

15 Claims, 14 Drawing Figures

METHOD AND DEVICE FOR CUTTING A BUNDLE OF TUBES

The invention relates to a method of cutting a bundle of tubes containing nuclear fuels, and to devices for working the method.

As is known, the first stage in the reprocessing of irradiated nuclear fuels consists in cutting the fuel-containing tubes into pieces having a preset length so that the fuels in the tubes can be dissolved in a suitable solution.

In order to obtain tube portions having a constant length, thus increasing the efficiency of the dissolving operation, it is necessary to use a reliable method and device, owing to the danger and difficulty of manipulating these fuels, which are highly irradiated and extremely dangerous.

Usually the nuclear fuel bundle comprises several hundred tubes between 1 and 1.5 cm in diameter and several meters long and containing fuel. The tubes are parallel and spaced apart by transverse spacers to form a square bundle having sides up to 30 cm long. At each end of the bundle, the tubes engage in a spigot, the two spigots being interconnected by longitudinal spacers. The spigots and spacers can be removed before the tubes are inserted into a shearing machine, but it is usually preferred to introduce the entire bundle into the shearing machine, which then has to cut the bundle near the spigots, cutting the spacers as well as the tube.

Owing to the high radioactivity of the fuel and the release of radioactive dust during cutting, safety precautions must be taken; the work must be done under remote control in a completely sealing-tight shielded cell, the apparatus and cell must be strongly ventilated to prevent dust from accumulating, and the part of the apparatus surrounding the bundle must be cooled.

Bundles of tubes containing nuclear fuel can be cut either by sawing, in a mill or by shearing. Shears are most frequently used in industrial installations, since they produce less dust than other devices.

The cutting, more particularly shearing, of irradiated nuclear fuel tubes has been subject to two serious practical difficulties: flattening of the end of the tube portions and breakage of the tubes at the wrong place instead of the cut. If the tubes are not firmly held near the cutting plane, they bend under the cutting force, resulting in a considerable reduction in the apertures at the ends of the portions. This reduction is unacceptable for the dissolving operation following cutting, since the dissolving solution attacks the fuel inside each portion by entering through its ends. Since the tubes are connected and spaced apart by spacers in the bundle, it is necessary, in order to hold the tubes firmly near the cutting plane, for the clamping force to be sufficient to deform the tubes and spacers until all the tubes are contiguous. The tubes become fragile during irradiation in the nuclear reactor, and the danger of breaking is considerable. Furthermore, these dangers must not impair the operation of the device, since a tube may escape from the clamping device and jam the apparatus. This usually has disastrous consequences, since access to the device is extremely difficult.

In 1962 the National Laboratory and Oakridge, U.S.A. published results obtained with two side clamps acting in parallel so as to hold the tubes near the cutting plane. The clamp further from the cutting plane had a considerable width and an inclined cross-section so as to deform the tubes progressively and prevent abrupt changes in curvature, where a fracture can start. This device is of use when the spigots of the bundle have been withdrawn before the bundle is introduced into the cutter, but it is preferable to simplify the operations progressively by introducing the entire bundle into the cutter. In that case, the great width and inclined surface of the side clamp further from the cutting plane greatly hinder the last cuts near the top spigot, since the side clamp cannot hold the tubes directly since its inclined surface bears on the spigot.

Furthermore, in modern cutting devices the bundles are brought to the cutter in a vertical position, and it is therefore advantageous to cut in a vertical position. This has not been done previously, since it has been feared that broken tubes may come apart from the bundle and fall outside the cutter; it appeared safer for the bundle to be horizontal. However we have found, by using a shearing machine on a horizontal bundle, that after the side clamps have been sufficiently withdrawn to remove them from the bundle, pieces of tubes at the top part of the bundle may fall slantwise and become sufficiently inclined to slide out of the shears and cause the accident which is most feared in the case of a vertical bundle. The invention, therefore, which reduces the danger of falling tubes, is advantageous irrespective of whether the bundle is horizontal, inclined or vertical.

Finally, the cutting operation should be sufficiently fast for the dissolver to be supplied with cut portions at a constant rate. The reason is that the fuel reprocessing speed is limited not by the cutting operation but by solution in the dissolver. In addition, fast cutting reduces the danger of irradiation.

The method and associated device according to the invention enable bundles of tubes to be cut in an efficient reliable manner, with greater safety and greater ease of operation than the prior art devices.

More specifically, the method according to the invention consists in that the bundle is introduced into a guide tube having an e.g. U-shaped cross-section.

The bundle is introduced in a substantially vertical or inclined position. In a first or "clamping" operation it is clamped by two side clamps against a coacting blade secured to the guide tube, the side clamps exerting a horizontal thrust on the free part of the bundle coinciding with the open part of the U; the two side clamps act consecutively or simultaneously. The first side clamp, i.e. the top clamp which is more remote from the bundle cutting section, is acted upon so as to exert sufficient thrust to limit the curvature of the bundle, and a second clamp nearer the cutting section is acted upon so as to exert sufficient horizontal thrust for the tubes in the bundle to become contiguous.

The limitation in curvature is difficult to quantify in a general manner, since it is very dependent on the nature of the fuel. Preliminary tests can be made on non-irradiated fuel to determine the acceptable limit of curvature.

In order to ensure that the tubes become contiguous near the cutting section but the deformation of the tubes is progressive, the thrust exerted by each side clamp on the bundle is adjusted as follows in dependence on the mechanical characteristics of the tubes. In the case of the clamp nearer the cutting section, the thrust is adjusted to a value sufficient for the tubes to become contiguous, whereas the thrust of the clamp further from the cutting section is adjusted at a lower value, just sufficient for the tubes to be progressively deformed.

Tests on irradiated fuels have proved that if the two thrusts are adjusted by this method, the clamp further from the cutting section can be made much narrower than in the prior art where it is desired to obtain progressive deformation as a result of the inclined surface of the clamp bearing against the bundle.

Next, in the method according to the invention, in a second or "cutting" operation, a blade is moved in a substantially horizontal plane and its leading edge cuts the bundle through a horizontal section. In a third operation in which the guided bundle is lowered, the blade is returned to its initial or rest position and a safety plate secured to the blade is simultaneously disposed underneath the bundle. The blade is held in position while the pressure on the two side clamps is being released and the bundle is being vertically lowered, after which the clamping and cutting operation can be repeated.

According to the invention, the tubes are progressively deformed by the aforementioned method of adjusting the thrusts, by reducing the width of the side clamp further from the cutting section and by eliminating the slope in its surface bearing on the bundle, thus facilitating the cutting of tubes near the spigot and reducing the danger that excessively long tubes will fall out of the cutting machine.

Over-long tube portions must be prevented from falling out at all cost in order to ensure that the system is reliable, since over-long broken tube may block the connection between the shearing machine and the component in which the tubes are dissolved, and the process of withdrawing them is long, dangerous and expensive.

Sometimes, in spite of precautions, particularly fragile tubes break at the wrong place instead of at the cut. These portions have to be stopped from falling when the clamps are released during the lowering operation. As already stated, the method hitherto has been to place the bundle horizontally in the cutter. It is desirable, however, for the bundle to be vertical, for a number of reasons, mainly with regard to the storage of vertical tubes in a pond. When the blade is no longer in the cutting position, the safety plate is placed below the bundle and the side clamps can be withdrawn if necessary, thus avoiding any risk of tubes falling into the dissolver. In this manner a vertical or inclined bundle can be cut in complete safety.

The device for working the method for cutting a bundle of tubes containing nuclear fuels comprises means for vertically moving the bundle inside a (U-shaped) guide tube secured to a stationary frame and having approximately the same dimensions in a horizontal plane as the bundle. Two superposed side clamps come in contact with the bundle in a horizontal plane; they are horizontally moved by hydraulic jacks or mechanical means. The device also comprises a coacting blade secured to the stationary frame, which is disposed below the guide tube substantially level with the bottom clamp; the device also comprises a cutting blade and means for moving the blade, whose leading edge moves substantially in a horizontal plane corresponding to the bottom edge of the coacting blade, and a movable horizontal safety plate secured to the blade and disposed opposite the bottom end of the bundle when the blade is in the inoperative position.

Thus, owing to the method and device according to the invention, which is also applicable to a horizontally disposed bundle, the side clamps are pressed against the bundle so as to limit the danger of tubes breaking owing to excessive curvature, the main aim being to prevent the tubes from overlapping when the clamps are released so as to move the bundle forward between two clamping operations.

Figure 2:
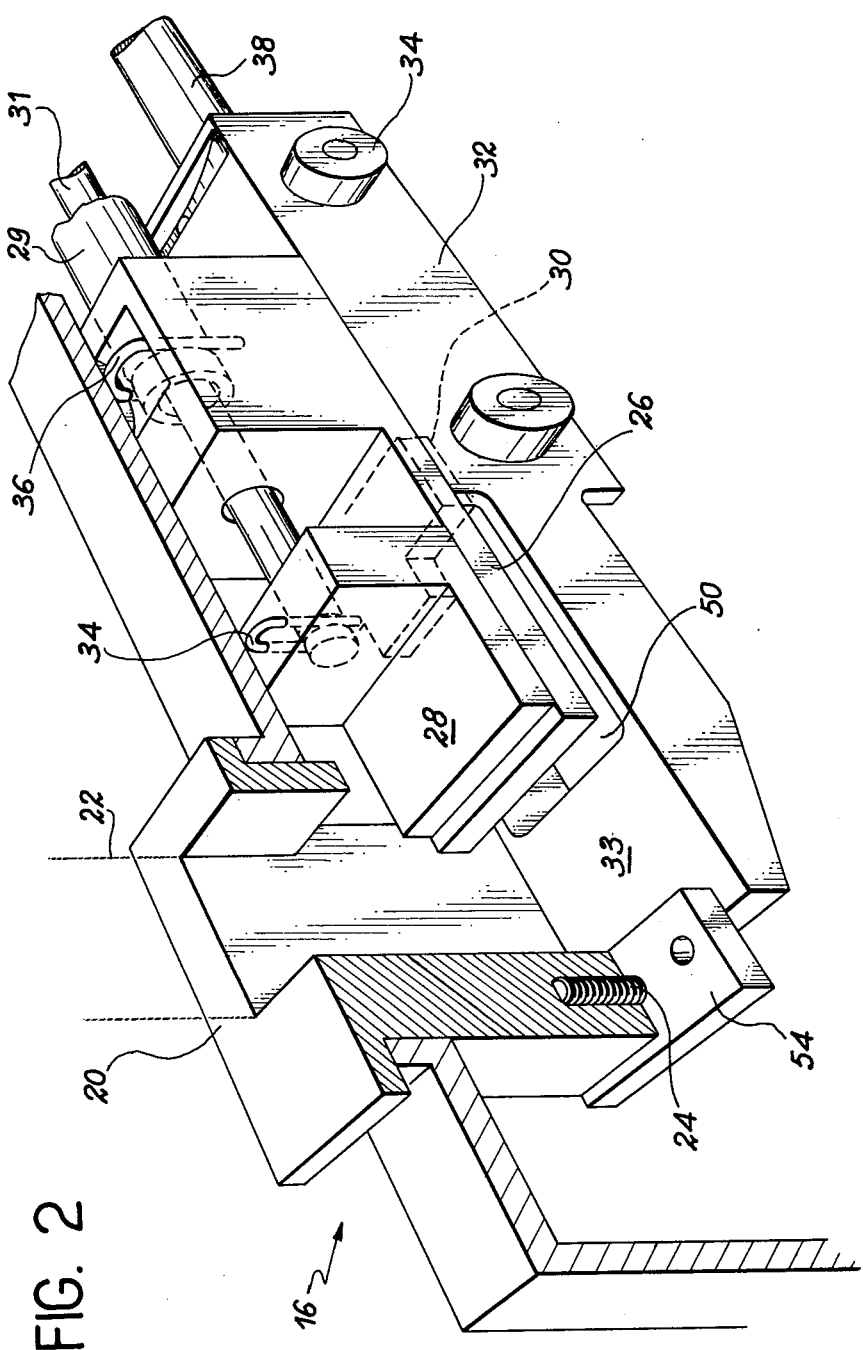
Figure 3A:
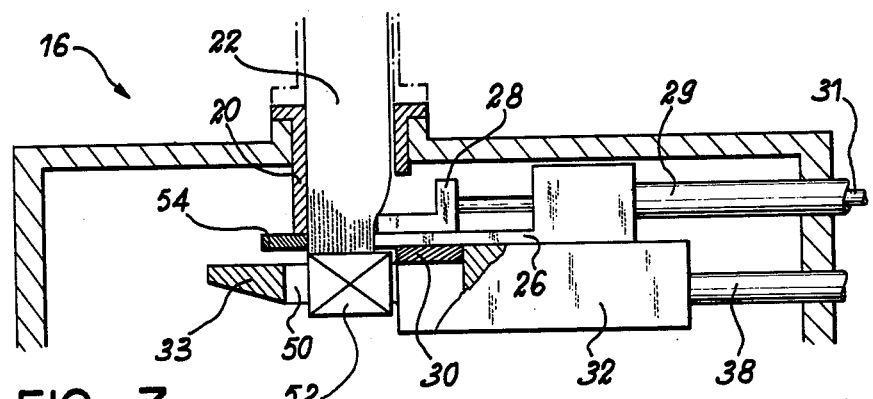
Figure 3B:
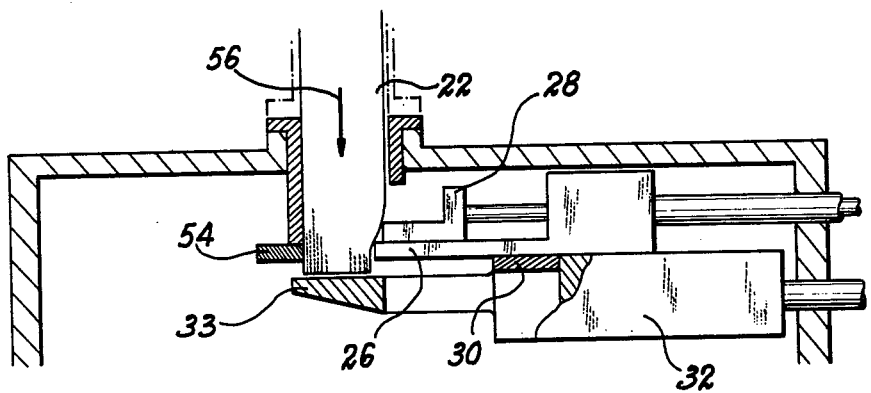
Figure 3C:
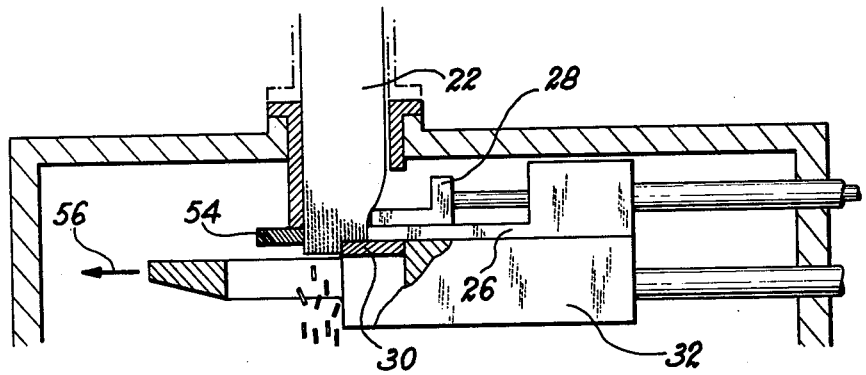
Figure 3D:
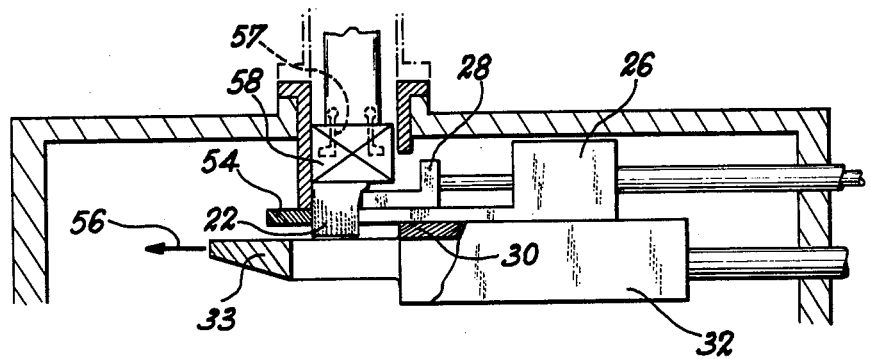
Figure 3E:
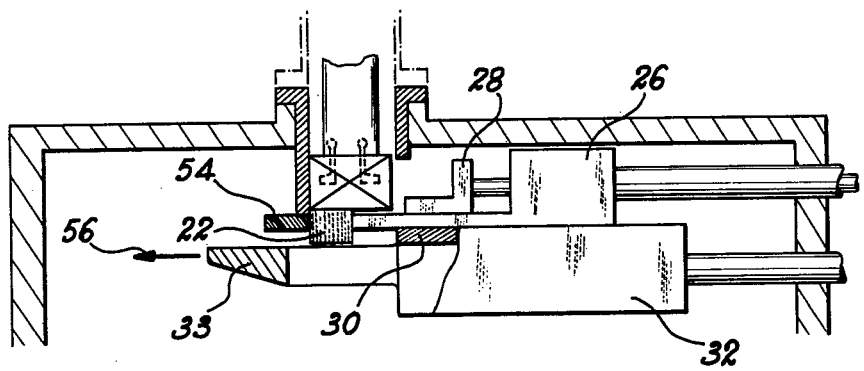
Figure 3F:
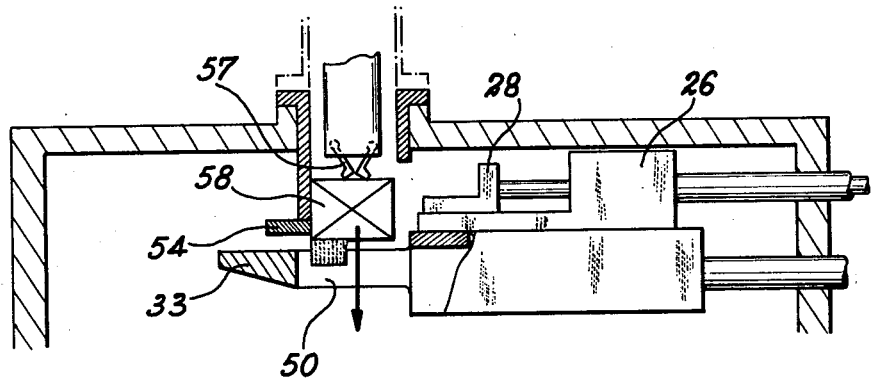
Figure 4A:
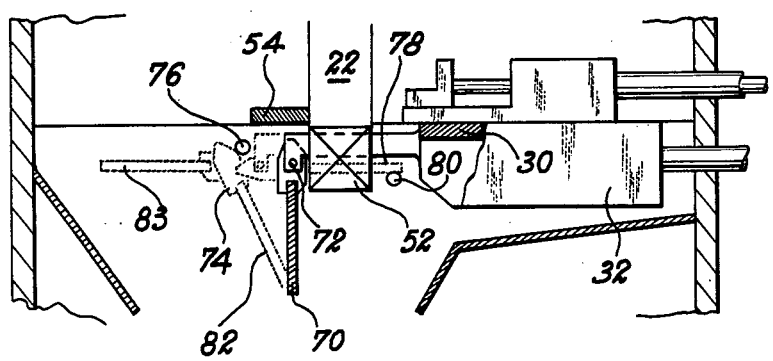
Figure 4B:
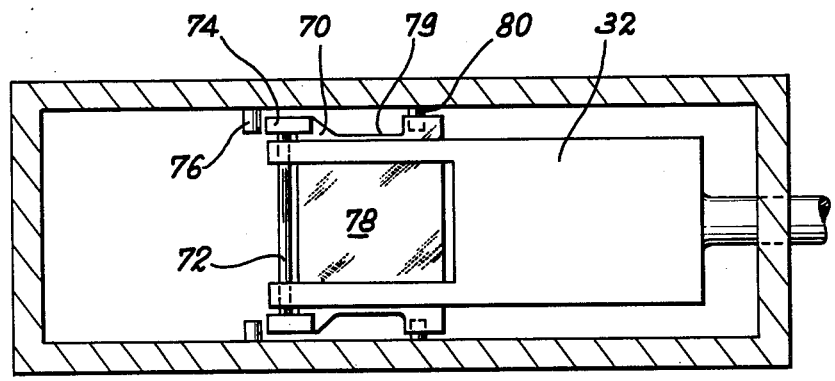
Figure 5:
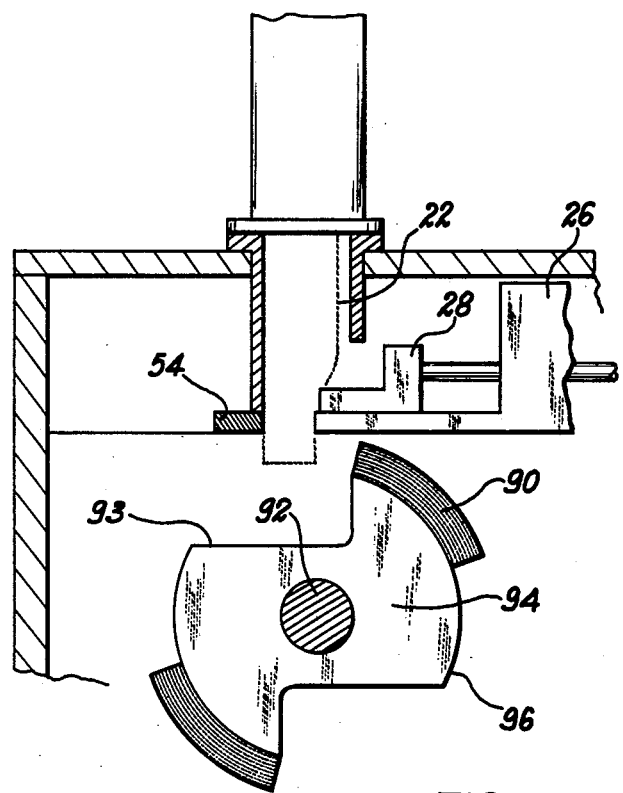
Figure 6:
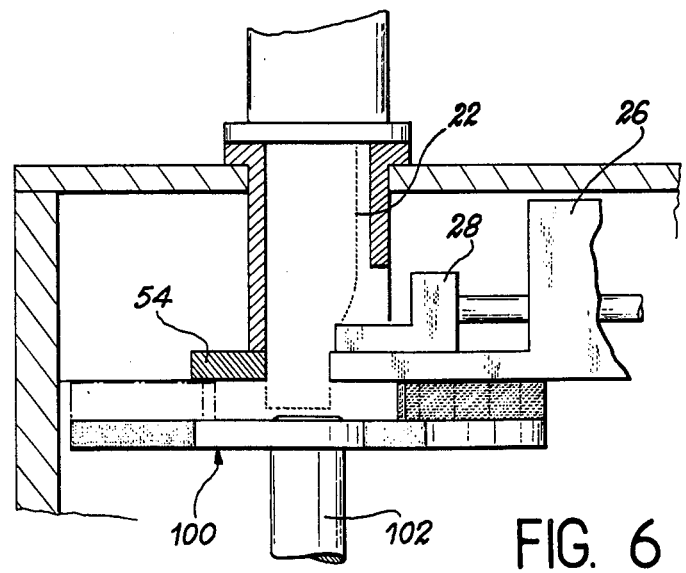
Figure 7:
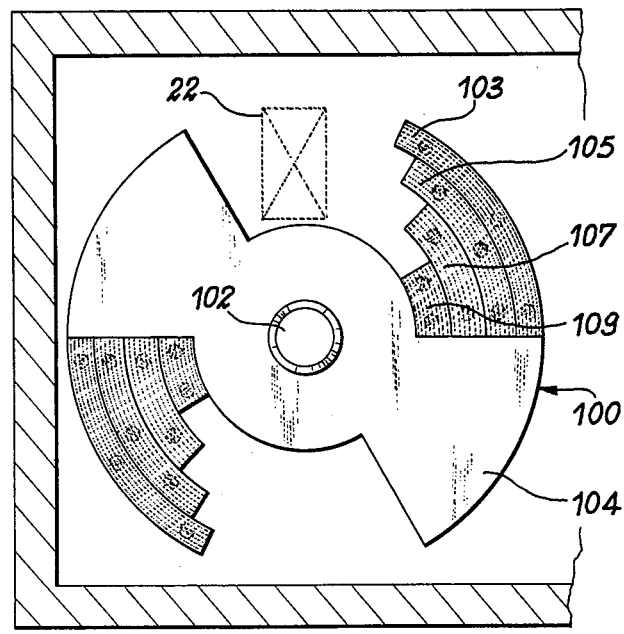
Figure 8:
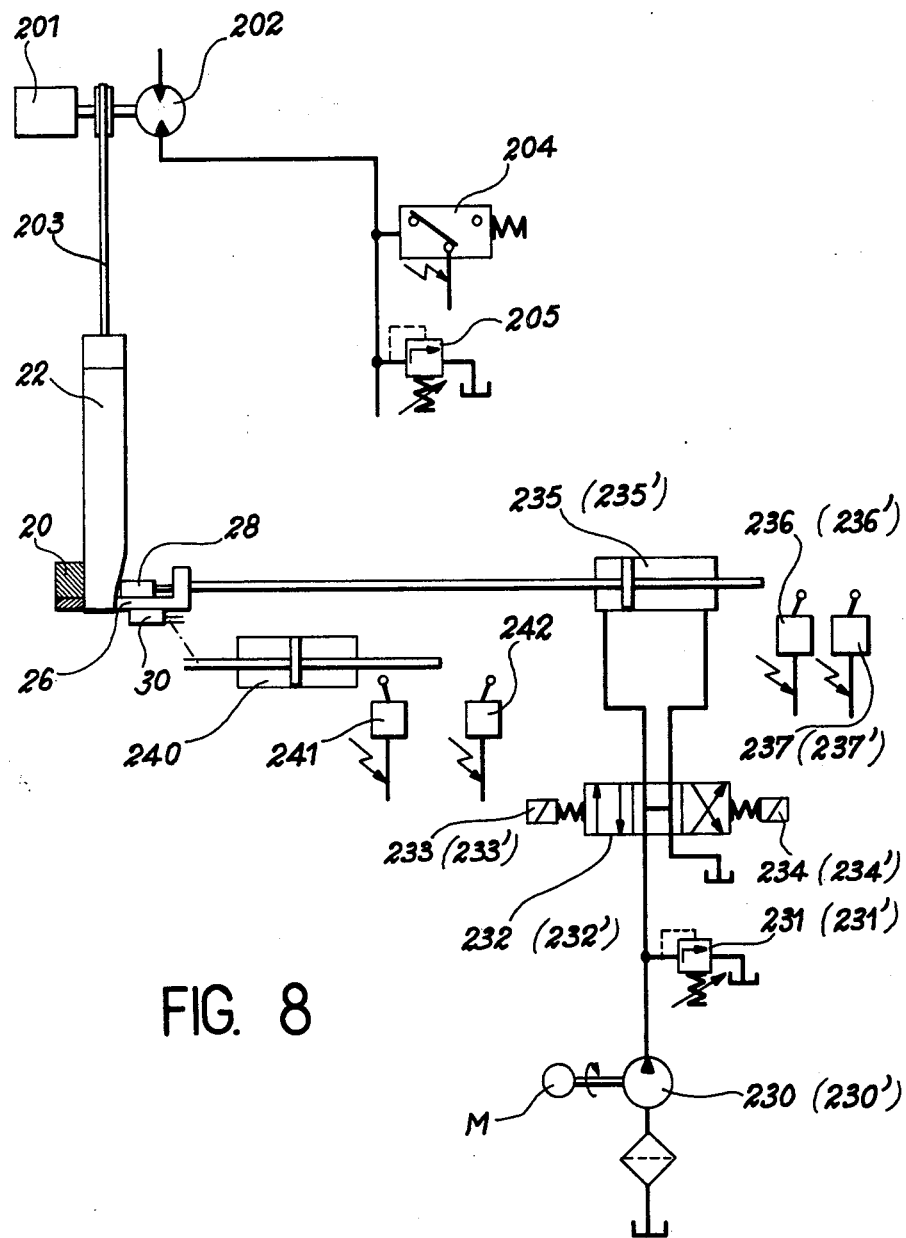

Other features and advantages of the invention will be clearer from the following description of explanatory non-limitative embodiments with reference to the accompanying drawings, in which:

FIG. 1 is a general view of the device for holding bundles of tubes filled with fuels, into which the cutting device according to the invention is inserted, FIG. 2 is a perspective view, partly in section, of the device for clamping and cutting bundles of tubes according to the invention, FIGS. 3a through 3f show the sequence of clamping and cutting operations illustrating the method and device according to the invention, FIGS. 4a, 4b show a variant of the safety blade, in side view in FIG. 4a and plan view in FIG. 4b, FIG. 5 shows a variant of cutting blades having horizontal axes, FIGS. 6 and 7 show a variant using cutting blades rotating around a vertical axis, and FIG. 8 is a diagram of the control circuit for the side clamps.

FIG. 1 is a general view of the device containing the shearing machine according to the invention. Bundles of tubes filled with nuclear fuel are stored in a pool 2 filled with water to give biological protection, the pond being surrounded by concrete walls 4. The bundles of tubes 6 are stored in vertical position. Before being sent into the dissolver 8, the tubes are taken by a conveyor 10 and raised into a store 12 which moves to a position 14 in which the end of a bundle is near a shearing means 16 according to the invention. After shearing, the cut portions of tube fall into a duct 18 and introduced into a dissolver 8.

FIG. 2 is a perspective view, partly in section, of the shearing device 16 according to the invention. A guide tube 20 has a U-shaped section containing a bundle of fuel tubes denoted by broken lines at 22. Tube 20 is secured to the frame by screws such as 24. The device according to the invention has two side clamps 26, 28 moved by jacks such as 29 and 31 (which may or may not be independent of one another). In this embodiment, a cutting blade 30 is secured to a slide 32 moving on rollers 34 along rails (not shown), a safety plate 33 being disposed below the bundle when the blade is in the inoperative position as shown in the drawing. The device can be dismantled by removing flanges 34, 36 and pushing back the rods of jacks 29, 31 after which clamps 26, 28 can be raised to give access to blade 30. Slide 32 is driven by a jack (not shown) coupled to the slide by a rod 38.

FIGS. 3a, 3b, 3c, 3d, 3e and 3f show a number of positions of the side clamps and the cutting blade, representing the different stages of the method according to the invention. In the position shown in FIG. 3a, the bottom spigot 52 of bundle 22 is introduced through an aperture 50 in the safety plate 33 so as to be cut. The two clamps 26, 28 compress bundle 22 just above spigot 52; blade 30 cuts the bundle at a short distance above the base spigot at the same time as it pushes the spigot, the bundle bearing against the coacting blade 54.

FIG. 3b shows the operation for lowering the bundle. In this case, the two compressive forces acting on the two clamps are eliminated after slightly withdrawing the clamps, the bundle 22 descending as shown in the direction of arrow 56 and plate 33 being disposed below the bundle by the moving slide 32, blade 30 being in the inoperative position.

FIG. 3c shows a stage in the cutting operation, in which blade 30 is cutting the bundle 22 which is held by the coacting blade 54, clamps 28, 26 gripping the bundle 22. During the cutting operation, slide 32 is moved by a jack (not shown) in the forward direction shown by arrow 56.

FIG. 3d shows the bundle 22 held by anchoring means 57 in a vertical position, the cut being made near the top spigot 58. In the stage shown in FIG. 3d, clamps 28, 26 can be clamped against the bundle for a new cutting operation, slide 32 moving forward in the direction of arrow 56.

On the other hand, during the last cut, in the immediate neighbourhood of the top spigot 58 shown in FIG 3e, only clamp 26 pressing bundle 22 against coacting blade 54 need be tightened. Clamp 28 does not move forward and slide 32 moves forward to cut the last portion near the spigot in the direction of arrow 56.

FIG. 3f shows the last stage of the method according to the invention; means 57 holding the tube via the top spigot 58 are loosened and the top spigot falls through aperture 50 in the safety plate.

Before the element is introduced into the shearing machine for cutting off the base spigot (FIG. 3a) and before the top spigot falls (FIG. 3f) slide 32 is placed in an intermediate position such that the aperture 50 in the safety plate is under the spigot.

FIGS. 4a, 4b show a variant embodiment of the safety plate according to the invention. FIG. 4b is a simplified plan view of the safety plate shown in FIG. 4a. The safety plate 70 is pivotable around a pivot 72 secured to the slide 32 bearing blade 30. Plate 72 is used to reduce the advance and return travel of the plate at the end of slide 32 and consequently reduce the length of the shearing frame; plate 70 is articulated to the ends of two arms secured to the blade-bearing slide 32. The last-mentioned feature is particularly advantageous for cutting elements having a large cross-section, where the blade-bearing member has to move considerable distances which interfere with the cutting rhythm of the machine.

When slide 32 is withdrawn into the inoperative position, the safety plate 70 is either:

horizontal under the bundle, to prevent tubes falling when the bundle moves for a new cut, or vertical, to leave a path for the portions of cut tubes and the spigots.

These positions are automatically obtained by moving slide 32. To this end, plate 70 has lateral cams 74 on the side on which it is articulated. Cams 74 cooperate with lugs such as 76 secured to the walls of the cutting machine frame.

(a) Before the element is introduced into the shearing machine for cutting off the base spigot, slide 32 is disposed in the inoperative position so as to leave a free passage for the base spigot 52 between the safety plate in the vertical position, shown at 70, and the front of blade 30.

(b) During the forward movement of the slide for the purpose of cutting off the base spigot, cams 74 of the safety plate, on the side on which it is articulated, make contact with lugs such as 76 disposed under the coacting plate 54. The safety plate then pivots in the opposite direction to the blade and reaches a horizontal position represented at 83. The plate returns to the vertical position as soon as the cams come away from the lugs.

(c) During the return motion of slide 32 after the base spigot 52 has been cut off, the cams on the articulation side make contact with lugs such as 76, and the safety plate pivots towards the blade into a horizontal position under bundle 22 as shown at 78, when the end of plate 70 remote from the articulation is above lugs 80 secured to the shearing machine frame. The slide continues to move backwards, during which cams 74 lost contact with lug 76 but plate 76 is held in the horizontal position by bearing on lugs 80.

(d) During the forward movement of slide 32 when the tubes of the bundle are cut, the end of the safety plate comes away from lugs 80 and the plate tilts into the vertical position before blade 30 reaches the bundle, thus providing a free passage for the pieces of cut tube.

(e) During the return motion of the slide after a cut, the safety plate moves in identical manner to that described in (c), different positions being represented by dotted lines at 78 and 82.

(f) During the return of the slide after the last cut in the tubes, the safety plate moves in identical manner to that described in (e). Grooves 79 are formed in the lateral edges 79 (FIG. 4b) of plate 70, so that when slide 32 withdraws further, plate 70 can come loose from the lugs against which it has been bearing, whereupon plate 70 pivots into the vertical position and provides a passage for the top spigot to fall.

Of course, a device substantially equivalent to that in FIG. 4 can comprise a plate such as 70 pivoting around a shaft such as 72, which will then engage in bearings secured to the stationary frame on the shearing machine, the safety plate being actuated either by lugs such as 76 secured to slide 33 or by a servomotor following the motion of the jack actuating slide 32 and blade 30. However, the device in FIG. 4 is preferable owing to its ease of maintenance, since the safety plate can easily be inspected at each change of blade.

FIG. 5 shows a variant of the device according to the invention comprising a blade 90 which can rotate around a horizontal shaft 92. This device can make two cuts at each revolution of wheel 94. Between each cut, a safety plate comprising part 96 of wheel 94 acts as a retaining member below bundle 22. The purpose of the recess bounded by shoulder 93 is to leave sufficient space for inserting the spigots.

FIGS. 6 and 7 show another embodiment of the shearing machine according to the invention, comprising a horizontal rotating plate provided with blades 100 moving around a vertical shaft 102 which is eccentric with respect to the axis of bundle 22. FIG. 6 is a side view of the device including the rotating plate 100. The blade is shown in plan view in FIG. 7. It comprises a number of elements 103, 105, 107, 109 which are independent, thus facilitating replacement. Between two cutting positions of the blades, a safety plate such as 104, which is in line with and in the same plane as the blades, is disposed opposite the end of bundle 22, and thus, as in the other embodiments, prevent the cut tubes from falling into the dissolver during the clamping operation or jamming the system.

The blades shown in FIGS. 6 and 7 are described in French Patent Specification 74-00998 dated Jan. 11, 1974 in the name of the present Applicants.

We shall now describe the entire process for moving the bundle forward between two cutting operations.

It will be remembered that the irradiated tubes, owing to their fragility, sometimes break in the wrong place instead of the cutting position, and the broken pieces of tube are liable to overlap and fall, thus interfering with the operation. Tests have shown that, in order to prevent tubes falling during the advance of the bundle between two cutting operations, the bundle must be prevented as far as possible from expanding when it is not firmly compressed by the side clamps. For this purpose, the following two rules must be followed:

(a) The U-shaped guide tube 20 in FIGS. 2 and 3 must be adapted to each kind of bundle so that the space between the arms of the U does not exceed the corresponding dimension of the bundle before compression by more than the diameter of the smallest tube forming the bundle, and (b) The return of the side clamps must be controlled so that the tubes remain in contact therewith during the forward motion of the bundle. For this purpose, the return motion must be not more than once or twice the diameter of a tube in the bundle, so that the resilience of the tubes keeps them in contact with the clamps.

When the compression exerted on the bundle by the clamps is removed after a cut, the clamps are still held by friction in contact with the tubes in the bundle. Tests have consistently shown that if an attempt is then made to move the bundle forward by pushing it, the thrust reached before the desired movement occurs becomes too great to be mechanically withstood by the bundle.

It is therefore necessary to withdraw the clamps slightly before beginning to move the bundle forward. A good result is obtained by limiting the withdrawal movement to approximately once or twice the diameter of a tube in the bundle, and by taking care that the clamp nearer the cutting section is withdrawn slightly further than the other clamp. The following is a description of the mode of operation for a manually-controlled shearing machine.

(a) After a cut and as soon as the safety plate is in position opposite the cut part, the two side clamps are withdrawn by a length equal to approximately once or twice the tube diameter, after which the two jacks of the two clamps are placed in open circuit so as to eliminate pressure differences between the two surfaces of a single piston.

(b) The bundle is longitudinally pushed by the pusher chain, driven by a hydraulic motor having a motor fluid pressure limited to the value corresponding to the thrust which is accepted as the maximum limit, allowing for the mechanical strength of the bundle. Frequently this thrust is sufficient to move the bundle forward by the desired amount, which is directly followed by phase (d) hereinafter.

(c) In some cases, particularly when a partly broken tube bears on the side of a clamp, it is impossible to move the bundle sufficiently far forward in accordance with (b) hereinbefore. In that case, the clamp is again withdrawn by a length equal to one or two tube diameters, after which the jacks are put into open circuit as described in (a).

(d) When the bundle has moved forward by a length equal to that of a tube portion, the longitudinal thrust on the bundle is eliminated and the two side clamps are compressed so that a new cut can be made.

In a preferred embodiment of the invention, all the cutting operations occur in an automatic cycle including a bundle feed sequence similar to that described hereinbefore in the case of manual control, except that the second return movement, if required, of the bundle is controlled in accordance with the thrust thereon, and the two withdrawals are controlled in accordance with the position of the blade and consequently of the safety blade.

FIG. 8 shows a circuit for automatically controlling the cutting operations, using the symbols recommended in Standard ISO R 1219 for the hydraulic means. A means 202, via a transmission 203, acts on the bundle 22 to be cut so as to move it forward (downwards in the case shown in the drawing, where the bundle is vertical) between two cutting operations. Members 202, 203 may advantageously be a hydraulic motor and a pusher chain of the kind described in French Patent Specification No. EN 75-27896 filed by the present Applicants. Member 205 is the pressure limiter for the hydraulic circuit supplying motor 202, and member 204 is a pressure contactor calibrated at a pressure slightly below the calibration pressure of limiter 205, the maximum pressure being limited to the value corresponding to the thrust on bundle 22 which is assumed to be the maximum limit, allowing for the mechanical strength of the bundle. Member 201 is a coder driven by the shaft of motor 202 and used to determine the length for which the bundle moves forward between two cutting operations, the motor 202 being stopped when the distance travelled forward is equal to the desired length of a tube portion. Member 230 is a hydraulic pump for actuating clamp 26 via jack 235. Member 231 is the pressure limiter on the hydraulic circuit actuating clamp 26, and its set value is adjusted in accordance with the type of bundle. Member 232 is a hydraulic distributor having four ways and three directions and an open centre, members 233 and 234 being the control coils of the distributor. Members 236, 237 are electric contacts actuated by the extended piston rod of jack 235. Members 230' and 237' (not shown in the diagram) cooperate with clamp 28 for the same purpose as the members bearing the corresponding numbers 230 to 237 in conjunction with clamp 26. Member 240 is a jack actuating shears blade 30, and electric contacts 241, 242 constitute the ends of the travel of jack 240. Member 20 is the guide tube of bundle 22. For each type of bundle, a guide 20 of appropriate width is positioned, the position of electric contacts 236, 236' and 237, 237' is adjusted in dependence on the thickness of the bundle after compression so as to limit the return movement of the clamps to once or twice the diameter of a tube in the bundle, the calibration pressure of limiter 231 is adjusted to ensure that the tubes are made contiguous by the action of clamps 26 without being crushed and the calibration pressure of limiter 231' is adjusted so that clamp 28 eliminates the risk of an abrupt variation in the tube curvature; the calibration pressures of limiter 205 and pressure contactor 204 are adjusted so that the thrust on the bundle does not exceed the maximum permitted value, and the position of contact 242 is adjusted so as to adapt the blade travel to the width of the bundle.

After these adjustments, the device operates automatically as follows: (the internal operation of the hydraulic components is not described in detail, since it is well known; reference can be made to numerous publications such as the work by Claude Dubois "Recueil de schemas d'hydraulique industrielle" P.I.C. Geneva 1974):

(a) During a tube cutting operation coils 234, 234' are energised and bundle 22 is gripped by clamps 26, 28 under the action of jacks 235, 235'. Since contact 242 is inoperative, it is impossible to actuate coils 234, 234' and 233, 233'. When blade 30 has finished cutting, the end-of-travel electric contact 241 causes the blade to be moved back by jack 240 and when the blade has returned a sufficient distance (when the safety plate is in position) the end-of-travel electric contact 242 stops jack 240, de-energises coils 234, 234' and energises coils 233, 233'.

(b) Jack 235, 235' move back, taking with them the clamps 26, 28 until electric contacts 236, 236' are actuated by the extended piston rods of jacks 235, 235' (the travel being limited to one or two tube diameters). Contacts 236, 236' (1) de-energise coils 233, 233', thus putting distributors 232, 232' in the open central position and balancing the pressures on each side of pistons 235 and 235' and (2) start the motor 202.

(c) Motor 202 exerts a thrust on the bundle, the thrust being nearly always sufficient for the bundle to make the required movement forward by a length equal to a tube portion without reaching the calibration pressure of contactor 204. Coder 205 thereupon terminates its predetermined travel and initiates phase (f) hereinafter. It may happen, however, that a broken tube abuts one of the clamps and consequently the calibration pressure of contactor 204 is reached, thus initiating phase (d) hereinafter.

(d) Contactor 204 energises coils 233, 233' (provided contact 242 is still actuated by rod 240), as a result of which jacks 235, 235' and clamps 26, 28 move back until contacts 237, 237' are actuated by the extended piston-rods of jacks 235, 235' and the contacts 237, 237' (1) initiate phase (e) hereinafter and (2) actuate an electric contact (not shown in the drawing) whose new position takes place of the control of coils 235, 235' by contactor 204 which, if required, would bring about the total stoppage of the automatic sequence if the calibration pressure of contactor 204 were reached.

(e) The hydraulic motor 202, which has continued to exert thrust on bundle 22 during phase (d) hereinbefore, moves the bundle forward and when the forward motion is complete coder 201 initiates phase (f) hereinafter. If the calibration pressure of contactor 204 is again reached before the bundle has completed its forward movement, contactor 204 commands the total stoppage of the automatic sequence for the reasons given in (d) hereinbefore and an operator has to intervene.

(f) When the bundle has finished moving forwards, coder 201 (1) stops motor 202; (2) energises coils 234, 234' for re-clamping the bundle; (3) causes the electric contact (not shown but mentioned in (d) hereinbefore) to return to the position in which the pressure contactor 204 can bring about phase (d). When the pressures in jacks 235, 235' have reached the preset values, jack 240 goes into action and pushes blade 30, which again cuts the bundle.

The description so far has related to shearing machines in which the bundle is vertical, but the invention can also be used to reduce the risk of tubes falling when the bundle is horizontal or inclined. The description relating to the vertical bundle can be adapted to a horizontal or inclined bundle simply by preserving the relative positions of the bundle, blade, clamps, guide tube, etc. i.e. the bundle always moves forward parallel to its longitudinal axis, the cutting section is always substantially perpendicular to the aforementioned longitudinal axis of the bundle, the blade and the clamps move parallel to the cutting section and the safety plate is placed opposite the cutting section and substantially parallel thereto. Care, however, should be taken to leave space for the spigot to travel downwards when a safety plate is used in a shearing machine where the beam is horizontal. For example, in the case of FIG. 3, the safety plate 33 should be connected only by a single arm (disposed above the spigot) to slide 32, which then moves in a vertical plane. The previously described guidance of the bundle with a small clearance, and the methods of clamping and subsequent controlled withdrawal of two clamps must necessarily be used to ensure that a shearing machine operates reliably, irrespective of the type of machine, the position of the bundle and the type of bundle. The use of a safety plate is particularly advantageous when the tubes are very fragile and when the withdrawal of the clamps is manually controlled and there is a risk that the operator may make a mistake. The apparatus may be simplified by omitting the safety plate in certain very favourable cases, e.g. when the tubes are not fragile or firmly held by the spacers or by a lining in which they are completely enclosed and when an automatic control signal ensures that the clamps are withdrawn properly.

A description has been given of the cuttingoff of a bundle introduced into the cutting machine in complete form, i.e. with its spigots and spacers, but the invention is equally useful for limiting the risk of falling tubes when the base spigot is removed from the bundle before insertion into the machine or when the bundle is completely dismantled and the spigots and spacers are removed, after which a number of tubes are grouped into a stack of parallel tubes disposed in a number of superposed layers and the new bundle is introduced into the cutting machine. (Complete dismantling of this kind is necessary when the tubes in the bundle contain a number of different fuels which have to be treated separately).

In addition, it may be advantageous to keep the safety plate under the bundle during the cutting operation so as to ensure absolute safety even during the cutting operation; in that case the portions cut by the blade fall on to the safety plates and do not tilt towards the dissolver until after the cuts, whereupon the portions are scraped off the safety plate or the plate tilts (FIGS. 4a, 4b). As shown in FIGS. 4a and 4b, a controllable device has to be provided for ensuring a free passage for the base spigot when cut.

We claim:

1. A method of cutting a bundle of tubes comprising the steps of inserting a bundle of tubes into a guide tube, said tubes being in parallel relationship with each other, clamping said bundle inside said guide tube by means of at least two movable clamps each of said clamps subjecting said bundle to a controlled thrust in a plane perpendicular to the lengths of said tubes, adjusting said thrust wherein said tubes in said bundle become contiguous with each other without their longitudinal curvature exceeding a predetermined value, moving a blade from an inital position to cut said bundle along a plane generally perpendicular to the lengths of said tubes, retracting said blade to said initial position, moving a safety plate adjacent the cut end of said bundle, withdrawing said clamps a first time by a limited amount, said tubes remaining in contact with said clamps, pushing said bundle toward said blade in a direction parallel to the length of said tubes and, moving said bundle into a cutting path of said blade.

2. A method according to claim 1, including removing said safety plate from said adjacent position after said clamping and before said moving of said blade to cut said bundle.

3. A method of cutting a bundle of tubes comprising the steps of inserting a bundle of tubes into a guide tube said tubes being in parallel relationship with each other clamping said bundle inside said guide tube by means of at least two movable clamps, each of said clamps subjecting said bundle to a controlled thrust in a plane perpendicular to the lengths of said tubes, adjusting said thrust wherein said tubes in said bundle become contiguous with each other without their longitudinal curvature exceeding a predetermined value, moving a blade from an initial position to cut said bundle along a plane generally perpendicular to the lengths of said tubes, withdrawing said clamps a first time by a limited amount, said tubes remaining in contact with said side clamps, pushing said bundle toward said blade in a direction parallel to the lengths of said tubes and, moving said bundle into a cutting path of said blade.

4. A method according to claim 1 including guiding said clamps to move in parallel planes perpendicular to the lengths of said tubes, one of said clamps acting upon said bundle so as to subject said bundle to a thrust sufficient to limit the curvature of said tubes in the bundle, the other of said clamps acting upon said bundle so as to exert sufficient thrust to cause said tubes in said bundle to become contiguous.

5. A method according to claim 1 including limiting a surface of each of said clamps to a width sufficient to prevent the tubes from being crushed during the clamping of the bundle, said surface bearing on said bundle and being parallel to one side thereof.

6. A method according to claim 1 including withdrawing said clamp a second time wherein said bundle cannot be moved forward by subjecting it to a thrust less than a maximum value compatible with the strength of the bundle, and limiting said second withdrawal of said clamps to at most approximately twice the diameter of one of said tubes comprising said bundle.

7. A method according to claim 6 including controlling said first and second withdrawing of said clamps in accordance with the position of said blade and the position of said safety plate, and automatically limiting the lengths of said withdrawing to at most approximately twice the diameter of one of said tubes in said bundle.

8. A method according to claim 6 including controlling said second withdrawing of said clamps in accordance with the amount of thrust exerted on the bundle to move it through said guide tube.

9. A device for cutting a bundle of tubes comprising:
a stationary frame, a removable guide tube and means for vertically moving a bundle of tubes inside said removable guide tube, said guide tube being secured to said stationary frame during operation:
two parallel side clamps and means for moving said side clamps in a direction perpendicular to the lengths of said tubes;
a stationary blade secured to said frame, said blade being adjacent an end of said guide tube nearest an end of said bundle to be cut and substantially opposite one of said side clamps which is nearer an end of said bundle to be cut;
a cutting blade movable from an initial position and coacting with said stationary blade and means for moving said cutting blade wherein a leading edge of said cutting blade moves substantially in a plane corresponding to an edge of said coacting blade remote from said guide tube; and
a movable safety plate and means for disposing it opposite the end of said bundle to be cut in a position substantially parallel to said blades and at a distance from the end of said bundle to be cut greater than the distance which said bundle moves forward between sequential cutting operations, when said cutting blade is in said initial position.

10. A device according to claim 9 wherein an inner surface of said removable guide tube is in the form of a cylinder having a generatrix parallel to the lengths of said tubes in said bundle, the directrix parallel to the cutting section having a U-shape, the spacing between the arms of the U not exceeding the corresponding dimension of the bundle before the clamping operation by more than the diameter of the smallest tube forming the bundle.

11. A device according to claim 9 wherein said safety plate is secured to a slide, said slide bearing said cutting blade so that, owing to the motion of said slide, said cutting blade is being placed opposite the end of the bundle to be cut when the blade is in said initial position said plate being placed in front of said leading edge of said cutting blade.

12. A device according to claim 9 wherein said safety plate pivots around an axis substantially parallel to said stationary blade.

13. A device according to claim 9 wherein cutting blade is secured to a cylindrical holder rotating around an axis substantially perpendicular to the lengths of said tubes in said bundle.

14. A device according to claim 13 wherein a part of a blade-holder behind said stationary blade acts as a safety plate when said cutting blade is in said initial position.

15. A device according to claim 9 wherein said cutting blade is secured to a mounting plate rotating around an axis substantially parallel to the longitudinal axis of the bundle said safety plate being constituted by a part of said mounting plate, said part being rotatively behind said blade.

* * * * *